United States Patent Office 2,786,057
Patented Mar. 19, 1957

2,786,057

PROCESS OF PRODUCING 5,5-DI-SUBSTITUTED BARBITURIC ACIDS AND PRODUCT PRODUCED THEREBY

William F. Bruce, Havertown, and Matt Ban, Ogden, Pa., assignors to American Home Products Corporation, New York, N. Y., a corporation of Delaware No Drawing. Application June 5, 1953,
Serial No. 359,973

2 Claims. (Cl. 260—257)

This invention relates to novel barbituric acids which are di-substituted in the 5-position, one of these substituents being a 2-alkoxyallyl group, and to the salts of these acids. It is also directed to the improved processes by which these new barbituric acid derivatives may be prepared.

Our new chemical compounds, barbituric acids containing two substituents in the 5-position, one of which is a 2-alkoxyallyl group, may be represented by the following generic formula:

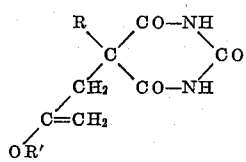

where R represents alkyl (preferably a straight or branched chain alkyl radical containing no more than five carbon atoms), allyl, or phenyl; and R' is a lower alkyl group.

Our new compounds have valuable pharmacological properties, being useful as hypnotic and soporific agents and for other purposes in both human and veterinary use. They exhibit very effective sedative action, and produce sound slumber with rapid onset thereof. Although they are highly potent as hypnotics, they are relatively less toxic than many of the barbituric acid derivatives which are presently in medical use. In general those compounds in which the sum of the carbon atoms in the substituents in the 5-position does not exceed eight are more valuable in regard to their pharmacological activity, and are preferred.

The salts of the 5,5-di-substituted barbituric acid (one substituent being a 2-alkoxyallyl group), particularly the alkali metal salts thereof, are recognized in pharmacology as the equivalent of the acids. These salts may be readily prepared by reacting the acids with a base, such as sodium hydroxide or potassium hydroxide. Accordingly, the salts of our new barbituric acids, exhibiting hypnotic and sedative action similar to that exhibited by the acids themselves, constitute part of our invention.

In preparing the new barbituric acid derivatives, a mono-substituted malonic ester may be condensed with urea to form the corresponding 5-mono-substituted barbituric acid. The latter may then be alkylated with an appropriate 2-alkoxyallyl halide, thereby forming the desired new 5,5-di-substituted barbituric acid derivative. If a salt of the acid is desired, the di-substituted barbituric acid is neutralized by the addition of a base.

This process may be represented as follows:

(1)

$$R''OOC.CH(R).COOR'' + H_2N.CO.NH_2 \xrightarrow{(NaOR'')}$$

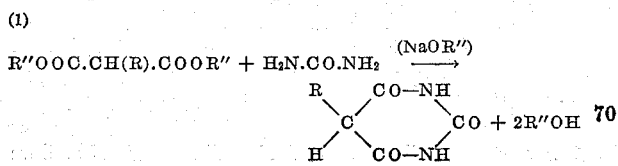

(2)

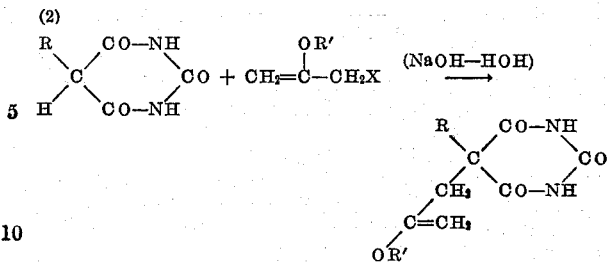

where R is alkyl (preferably a straight or branched chain alkyl radical containing no more than five carbon atoms), allyl, or phenyl; R' is a lower alkyl radical; R'' represents a lower alkyl group; and X is a halogen.

Alternatively, a mono-substituted malonic ester may be alkylated to yield a di-substituted malonic ester, one of the substituents being a 2-alkoxyallyl group; and this di-substituted malonic ester may then be condensed with urea to yield the new 5,5-di-substituted barbituric acids and their salts, particularly the alkali metal salts thereof. Thus an alkyl malonic ester, allyl malonic ester, or phenyl malonic ester may be alkylated in order to introduce a 2-alkoxyallyl group, and the resulting di-substituted malonic ester reacted with urea to yield a 5,5-di-substituted barbituric acid (or salt thereof) one of the substituents in the 5-position being a 2-alkoxyallyl group, and the other being alkyl (preferably a straight or branched chain alkyl radical containing no more than five carbon atoms), allyl, or phenyl.

This process may be represented as follows:

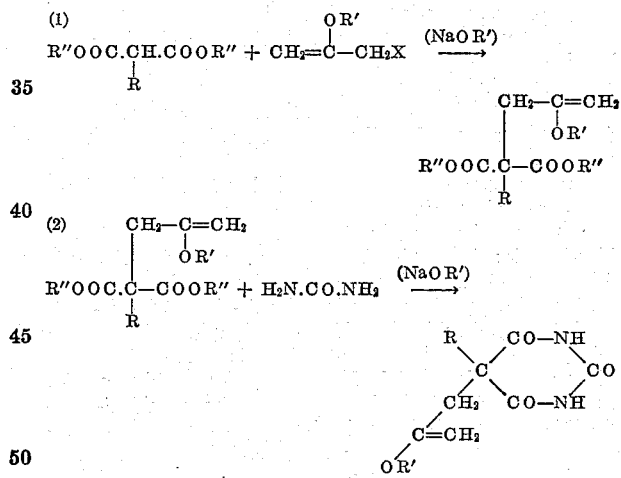

where R is alkyl (preferably a straight or branched chain alkyl radical containing up to 5 carbon atoms inclusive), allyl, or phenyl; R' is a lower alkyl radical; R'' is a lower alkyl group preferably the same as R'; and X is a halogen.

As before, by neutralization with a base, salts of the 5,5-disubstituted barbituric acids, equivalent in pharmacological action to the acids themselves, are produced.

It is therefore possible first to prepare a 5-mono-substituted barbituric acid by condensation of a mono-substituted malonic ester with urea, and then introduce the 2-alkoxyallyl group in the 5-position, or first to introduce the 2-alkoxyallyl group into the malonic ester, and then carry out the condensation with urea to form the novel 5,5-disubstituted barbituric acids, one of the substituents in the 5-position being 2-alkoxyallyl.

The 2-alkoxyallyl halide used to alkylate the 5-substituted barbituric acid in the first variation of our improved procedure, or to alkylate the malonic ester in the second, may conveniently be made by cracking the corresponding halogenoacetone dialkyl ketal, either catalytically or by heat, in either the liquid or vapor phase. This process may be represented chemically as follows:

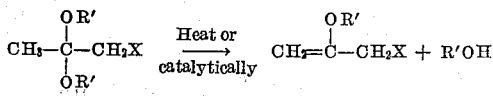

where R' represents a lower alkyl group, preferably one containing not more than four carbon atoms, X representing a halogen.

In accordance with our first procedure, the mono-substituted malonic ester is preferably condensed with urea using a condensing agent such as an alkali metal, alkali metal hydride, or alkali metal alkoxide, carrying out the condensation in an inert solvent. The alkylation of the resulting mono-substituted 5-alkyl barbituric acid is preferably carried out in a solution which is neutral or slightly basic in reaction, and which contains a catalytic agent such as copper sulfate. The cracking of the halogenoacetone dialkyl ketal in the liquid or vapor phase to form the 2-alkoxyallyl halide is readily accomplished in the usual manner, either by heating, by the use of a catalyst such as alumina, or by both.

When proceeding in accordance with our second variation or process, the malonic ester, containing an alkyl (straight or branched chain, and no more than five carbon atoms), allyl, or phenyl substituent, is alkylated to introduce a 2-alkoxyallyl group in the 5-position by refluxing the ester in the presence of an alkali metal such as sodium and an anhydrous alcohol, preferably in an inert solvent, and then adding an excess of the 2-alkoxyallyl halide. Condensation of the disubstituted malonic ester and urea is effected in the usual manner, preferably using a condensing agent such as an alkali metal, alkali metal hydride, or alkali metal alkoxide, the reaction being advantageously carried out in an inert solvent.

The new chemical compounds, the 5,5-di-substituted barbituric acids, one substituent in the 5-position being a 2-alkoxyallyl group, may be recovered as crystalline products, and they may be purified by recrystallization from one or several additional solvents in the customary manner.

Among compounds so produced and falling within the scope of our invention, the following specific compounds may be named: 5-ethyl-5-(2'-methoxyallyl)barbituric acid; 5-propyl-5-(2'-methoxyallyl)barbituric acid; 5-isopropyl-5-(2'-methoxyallyl)barbituric acid; 5-n-butyl-5-(2'-methoxyallyl)barbituric acid; 5 - isobutyl - 5 - (2'-methoxyallyl)barbituric acid; 5 - sec-butyl-5-(2'-methoxyallyl)barbituric acid; 5-sec-amyl-5-(2'-methoxyallyl)barbituric acid; 5-isoamyl-5-(2'-methoxyallyl)barbituric acid; 5 - phenyl - 5 - (2'-methoxyallyl)barbituric acid; 5-allyl-5 - (2' - methoxyallyl)barbituric acid; 5 - ethyl - 5 - (2'-ethoxyallyl)barbituric acid; 5-n-propyl-5-(2'-ethoxyallyl)barbituric acid; 5 - isopropyl - 5 - (2'-ethoxyallyl)barbituric acid; 5 - sec - butyl - 5 - (2'-ethoxyallyl)barbituric acid; 5 - isobutyl - 5 - (2'-ethoxyallyl)barbituric acid; 5 - sec - amyl - 5 - (2'-ethoxyallyl)barbituric acid; 5-isoamyl - 5 - (2'-ethoxyallyl)barbituric acid; 5 - ethyl-5-(2'-n-propoxyallyl)barbituric acid; and 5 - ethyl - 5 - (2'-isopropoxyallyl)barbituric acid.

The following examples are illustrative of our invention:

EXAMPLE 1

A. *Preparation of bromoacetone dimethyl ketal*

A mixture of 196 grams of trimethyl orthoformate, 12.5 milliliters of anhydrous ethanol, and 160 grams of bromoacetone was allowed to stand at room temperature in the presence of 0.63 gram of 95% sulfuric acid. (The bromoacetone was prepared by the method described in Organic Synthesis, vol. II, page 88.) At the end of twenty-four hours the acid was neutralized by adding dimethyl aniline. Alcohol and methyl formate were then distilled off at slightly reduced pressure, followed by distilling off the bromoacetone dimethyl ketal at a further reduced pressure.

B. *Preparation of 2-methoxyallyl bromide*

The bromoacetone dimethyl ketal was thermally cracked by fractionation in a Todd column, one mole of alcohol being split out to form 2-methoxyallyl bromide. The column was operated at total reflux until the boiling point remained constant. Alcohol was then distilled off until the boiling point started to rise, whereupon total refluxing was resumed. This cycle was repeated until no more alcohol was formed. The fraction remaining boiled at 65–67° C. at a reduced pressure of 60–62 millimeters of mercury, and was 2-methoxyallyl bromide.

C. *Preparation of 5-sec. butyl-5-(2'-methoxyallyl) barbituric acid*

Mono sec. butyl barbituric acid in the amount of 15.5 grams was dissolved in one equivalent (85 milliliters) of 1 N sodium hydroxide solution. There were then added 15 grams of 2-methoxyallyl bromide and 0.5 gram of copper sulfate. The mixture was mechanically shaken for three hours. The resulting solid product was then separated by filtration, and purified by successive recrystallization from a mixture of ethyl acetate and heptane; from chloroform; and again from the mixed ethyl acetate-heptane solvent. The resulting product was 5-sec. butyl-5-(2'-methoxyallyl)barbituric acid, having the empiric formula $C_{12}H_{18}N_2O_4$, and melting at 174.5–176° C.

D. *Preparation of the sodium salt of 5-sec. butyl-5-(2'-methoxyallyl)barbituric acid*

5-sec. butyl-5-(2'-methoxyallyl)barbituric acid in the amount of 0.5107 gram, as prepared above, was dissolved in the minimum amount of methyl alcohol necessary to bring it into solution. This solution was then added to one equivalent of 0.1 N sodium hydroxide solution (evaporated to dryness) and shaken intermittently at 0° C. After one hour the solvent was evaporated off at a reduced pressure less than atmospheric, the slushy residue filtered off, and the resulting solid triturated with dry diethyl ether. By filtration there was obtained the sodium salt of 5-sec. butyl-5-(2'-methoxyallyl)barbituric acid, which was dried at a temperature of 100° C. under a reduced pressure of 1–5 millimeters of mercury. The empiric formula of the resulting salt was $C_{12}H_{17}N_2O_4Na$, as confirmed by analysis.

EXAMPLE 2

*Preparation of 5-sec. amyl-5-(2'-methoxyallyl)barbituric acid*

Chloroacetone dimethylketal was prepared by the method of Lampiew (Ber. 40, 3304; 62, 2387), and 146 grams were charged in an atmosphere of nitrogen through a capillary tube of 0.2 millimeter diameter at the rate of one drop per second over an inert packing of Berl saddles contained in an electrically heated tube which was 25 millimeters in diameter and 450 millimeters in length. The chloroacetone dimethylketal was thermally decomposed therein, the temperature being maintained at 300–310° C. The emerging vapors were condensed, collected and distilled. A distillate boiling within the range 100–115° C. in the amount of 107 grams was collected, and this was fractionated in a Todd column. After fractionation there was recovered 31.7 grams of the starting material, and 11.9 grams of 2-methoxyallyl chloride, which boiled at 41° C. at a reduced pressure equivalent to 105 millimeters of mercury.

Analysis confirmed that the product was 2-methoxyallyl chloride of empiric formula $C_4H_7OCl$. Its refractive index (for the D line of sodium) at 25° C. was 1.4340, and its density at the same temperature was 1.054.

5-mono-sec. amyl barbituric acid in the amount of 10.2 grams was dissolved in 51.5 milliliters of 1N sodium hydroxide solution. To this there was added 5.5 grams of 2-methoxyallyl chloride and 0.1 gram of copper sulfate. The reaction mixture was mechanically shaken for forty-eight hours at 30° C. The solid product was then separated by filtration, and purified by two recrystallizations, each time from a mixture of ethyl acetate and heptane.

Analysis confirmed the product to be 5-sec. amyl-5-(2'-methoxyallyl)barbituric acid, of empiric formula $C_{13}H_{20}N_2O_4$. The melting point of the crystalline product was 156–7° C.

EXAMPLE 3

*Preparation of 5-isoamyl-5-(2'-methoxyallyl)barbituric acid*

2-methoxyallyl chloride was prepared by charging 100 grams of chloroacetone dimethylketal in an atmosphere of nitrogen through a capillary tube of 0.2 millimeter diameter at the rate of 10 drops every 17 seconds, the ketal then passing over aluminum oxide as catalyst. The alumina was contained in an electrically heated column 25 milliliters in diameter and 450 millimeters long. The chloroacetone dimethylketal was catalytically decomposed at a reaction temperature of 230–260° C. The emerging vapors were condensed, the product taken up in ether, washed successively with two portions of ice-cold sodium carbonate solution, and dried over anhydrous magnesium sulfate. The ether was removed by distillation at atmospheric pressure, and the residue fractionated in a Todd column. There was thus produced 2-methoxyallyl chloride, boiling at 56° C. at a reduced pressure of 144 millimeters of mercury.

Isoamyl barbituric acid in the amount of 5.1 grams was dissolved in the equivalent amount of 10% sodium hydroxide solution, and 2.5 grams of 2-methoxyallyl chloride and 0.1 gram of copper sulfate were added to the solution. The reaction mixture was mechanically shaken overnight. The resulting solids were separated by filtration and dissolved in anhydrous methanol. The solution was decolorized with decolorizing carbon, and the product reprecipitated therefrom by the addition of triple-distilled deionized water. The resulting crystalline product was recrystallized from a mixture of methanol and triple-distilled, de-ionized water.

The crystalline product thus obtained was 5-isoamyl-5-(2'-methoxyallyl)barbituric acid, melting at 187–8° C.

EXAMPLE 4

*Preparation of 5-phenyl-5-(2'-methoxyallyl)barbituric acid*

5-phenyl-barbituric acid in the amount of 5.1 grams was suspended in 100 milliliters of water. To this there was added sufficient of a 10% solution of sodium hydroxide to bring the 5-phenyl barbituric acid into solution (pH=7). There were then added 0.1 gram of copper sulfate and 2.6 grams of 2-methoxyallyl chloride (prepared as described in Example 3).

The reaction mixture was mechanically shaken overnight at room temperature. The solids which formed therein were separated by filtration, and recrystallized from a mixture of methanol and triple-distilled, de-ionized water. There was thus obtained the crystalline product, 5-phenyl-5-(2'-methoxyallyl)barbituric acid, melting at 211–12° C.

EXAMPLE 5

*Preparation of 5-sec. butyl-5-(2'-ethoxyallyl)barbituric acid*

2-ethoxyallyl chloride was prepared by thermal decomposition of 250 milliliters of chloroacetone diethylketal, the latter having been prepared by the method of Lampiew referred to in Example 2. The thermal decomposition was carried out by heating the ketal at total reflux in a Todd column for 2–3 hours at atmospheric pressure, followed by redistillation at reduced pressure of the collected distillate. There was thus obtained a fraction boiling at 40–60° C. at 20–30 millimeters of mercury pressure. This was again fractionated in a Todd column to yield 2-ethoxyallyl chloride, boiling at 45–6° C. at 33 millimeters of mercury pressure. Its refractive index for the D line of sodium at 25° C. was 1.4311.

Sec. butyl barbituric acid in the amount of 18.4 grams was dissolved in one equivalent of 1N sodium hydroxide solution. To this there were added 12.1 grams of 2-ethoxallyl chloride and 0.2 gram of copper sulfate ($CuSO_4$). The reaction mixture was mechanically shaken at room temperature for twenty hours. The resulting solids were separated from the reaction mixture by filtration, and purified by successive recrystallizations using ethyl acetate, benzene, chloroform, and finally a mixture of ethyl acetate and heptane as the recrystallization solvents.

There was thus obtained crystalline 5-sec. butyl-5-(2'-ethoxyallyl)barbituric acid, melting at 194–5° C.

Example 6

*Preparation of 5-isobutyl-5-(2'-ethoxyallyl)barbituric acid*

Mono-isobutyl barbituric acid in the amount of 9.25 grams was dissolved in 50 milliliters of 1N sodium hydroxide solution. To this solution there was added six grams of 2-ethoxyallyl chloride (prepared as in Example 5), and 0.2 gram of copper sulfate ($CuSO_4$). The resulting mixture was mechanically shaken for twenty-one hours at room temperature. The solids, which formed therein, were separated by filtration, and the product purified by recrystallization from ethyl acetate, benzene, and finally from diethyl ether as crystallization solvents. The resulting crystalline product thus obtained was 5-isobutyl-5-(2'-ethoxyallyl)barbituric acid, melting at 176–7° C.

EXAMPLE 7

*Preparation of 5-sec. amyl-5-(2'-ethoxyallyl) barbituric acid*

2-ethoxyallyl chloride, prepared as in Example 5, in the amount of 24.1 grams was added dropwise to a solution of 5-sec. amyl barbituric acid in an equivalent amount of 1 N sodium hydroxide solution. The resulting reaction mixtuer was stirred overnight at room temperature. At the end of this period of agitation, there was added to the slightly acid solution one drop of 40% sodium hydroxide solution, and the reaction mixture mechanically agitated for an additional period of sixteen hours. The reaction mixture was then neutralized by the addition of carbon dioxide gas, and the solids precipitated therein was separated by filtration. This solid product was then recrystallized, first from ethyl acetate, and then from a mixture of ethyl acetate and n-heptane.

The resulting crystalline product was 5-sec. amyl-5-(2'-ethoxyallyl)barbituric acid, melting at 156–8° C.

EXAMPLE 8

*Preparation of 5-isoamyl-5-(2'-ethoxyallyl)barbituric acid*

5-isoamyl barbituric acid in the amount of 11 grams was dissolved in an equivalent amount of 1 N sodium hydroxide solution. To this there were added 7 grams of 2-ethoxyallyl chloride (prepared as in Example 5) and 0.2 gram of copper sulfate. The reaction mixture was then shaken together at room temperature for 10 hours. The solids which formed therein were removed by filtration. After several repeated crystallizations of this solid product from a mixture of ethyl acetate and heptane, and from benzene, there was obtained crystalline 5-isoamyl-5-(2'-ethoxyallyl) barbituric acid, melting at 156–157.5° C.

EXAMPLE 9

*Preparation of 5-allyl-5-(2'-methoxyallyl)barbituric acid*

A. ALKYLATION OF ETHYL ALLYL MALONATE

To a refluxing mixture of equimolar quantities of metallic sodium and anhydrous ethyl alcohol in dry toluene (1000 milliliters per mole), an equivalent of ethyl allyl malonate was added. The mixture was stirred and refluxed for 10 minutes; then the alcohol liberated in the formation of the sodio malonate derivative was distilled off (head temperature 110° C.). A slight excess of 2-methoxy allyl bromide was then added, and the reaction mixture refluxed overnight. After cooling, the reaction mixture was poured on ice. The organic layer was separated, and the aqueous phase extracted with ether. The combined toluene-ether solutions were dried over magnesium sulfate. The solvents were removed under reduced pressure at 90–100° C. The residue was fractionally distilled. The ethyl 2-methoxy-allyl allyl malonate, thus secured, boils at 101–3° C. at 0.5 mm. of mercury pressure.

B. CONDENSATION OF DISUBSTITUTED MALONIC ESTER AND UREA

To 0.279 moles of metallic sodium (150% excess), 100 milliliters of ethanol (distilled from sodium) was added, with stirring. The mixture was refluxed until all of the sodium was in solution; then 0.221 moles of urea (100% excess) was added. When the urea was completely in solution, 0.116 mole of the disubstituted malonate, prepared as described, was added, dropwise.

The reaction mixture was then refluxed and stirred for 14 hours (after addition was complete). The alcohol was distilled off at reduced pressure (100 mm.), toluene being added to facilitate removal of last traces. The residue was decomposed in 200 milliliters of water. The aqueous layer was washed with toluene, and then acidified with 50% sulfuric acid to a pH of 7. The solid product was recrystallized twice from ethyl acetate-hexane; then from acetone-water. The material was then dissolved in dilute aqueous caustic solution, and fractionally precipitated with carbon dioxide. The first fraction collected was 5-allyl-5-(2'-methoxyallyl)barbituric acid. Its melting point was 167–9° C. Analysis confirmed the empirical formula: $C_{11}H_{14}N_2O_4$.

Since the salts of the new 5,5-di-substituted barbituric acids, one of the substituents in the 5-position of which is a 2-alkoxyallyl group, and, in particular, the alkali metal salts thereof, are pharmacologically equivalent to the acids, in those appended claims wherein no specific reference is made to salts, they are intended to be comprehended within the term acid or acids.

The salts may be formed from the acids immediately before their use by physicians or veterinarians, by dissolving the 5,5-di-substituted barbituric acid in an equivalent amount of dilute alkali, such as dilute aqueous sodium hydroxide, dilute aqueous potassium hydroxide, etc.

The above description and examples are intended to be illustrative only. Modifications thereof, as well as variations therefrom, which conform to the spirit of the invention are intended to be included within the scope of the appended claims.

We claim:

1. 5-phenyl-5-(2'-methoxyallyl)barbituric acid.
2. The process of preparing 5,5-di-substituted barbituric acid derivatives wherein one of the substituents in the 5-position is a 2-alkoxyallyl group and the other substituent is a radical selected from the group which consists of straight and branched chain alkyl radicals containing no more than five carbon atoms, allyl, and phenyl, which comprises reacting a 5-monosubstituted barbituric acid derivative, said substituent in the 5-position being selected from the group which consists of straight and branched chain alkyl radicals containing no more than five carbon atoms, allyl, and phenyl, with a 2-alkoxyallyl halide, said reaction being carried out by bringing said reactants together in the presence of copper sulfate as a catalyst.

References Cited in the file of this patent

UNITED STATES PATENTS

| | | |
|---|---|---|
| 2,006,610 | Tabern | July 2, 1935 |
| 2,019,936 | Shonle | Nov. 5, 1935 |
| 2,035,317 | Heilner | Mar. 24, 1936 |
| 2,222,455 | Cope | Nov. 19, 1940 |
| 2,313,501 | Bachman et al. | Mar. 9, 1943 |
| 2,394,195 | McElvain et al. | Feb. 5, 1946 |